US005799391A

United States Patent [19]

Tillotson

[11] Patent Number: 5,799,391

[45] Date of Patent: Sep. 1, 1998

[54] APPARATUS FOR SIGNIFICANTLY ADVANCING A CARRIER STRIP AND CRIMPING VARIOUS TERMINAL CONFIGURATIONS

[75] Inventor: John Tillotson, Scottsdale, Ariz.

[73] Assignee: Spring Air . . . Works, Inc., Scottsdale, Ariz.

[21] Appl. No.: 721,587

[22] Filed: Sep. 25, 1996

[51] Int. Cl.$^6$ .......................... H01R 43/042; B23P 19/00

[52] U.S. Cl. ................................ 29/753; 29/863; 72/184; 72/712

[58] Field of Search .............................. 29/753, 861, 863, 29/33 M, 751, 755; 72/446, 712, 184

[56] References Cited

U.S. PATENT DOCUMENTS

| | | | |
|---|---|---|---|
| 3,009,197 | 11/1961 | Hahn . | |
| 3,071,174 | 1/1963 | Kerns . | |
| 3,184,950 | 5/1965 | G. C. Sitz | 29/753 X |
| 3,274,664 | 9/1966 | Andren et al. . | |
| 3,583,055 | 6/1971 | Hammond . | |
| 3,659,328 | 5/1972 | Klein . | |
| 3,766,625 | 10/1973 | Wagner | 29/753 |
| 3,911,717 | 10/1975 | Yuda . | |
| 4,114,253 | 9/1978 | Loomis et al. | 29/753 |
| 4,283,846 | 8/1981 | Collier . | |
| 4,718,160 | 1/1988 | Bulanda et al | 29/566.2 |
| 4,805,278 | 2/1989 | Bulanda et al. . | |
| 4,856,183 | 8/1989 | Belaidouni et al. . | |
| 5,174,022 | 12/1992 | Phillips et al. | 29/863 |
| 5,289,713 | 3/1994 | Schafer | 72/446 |
| 5,440,799 | 8/1995 | Marshall et al. . | |
| 5,471,741 | 12/1995 | Heisner et al. . | |
| 5,517,749 | 5/1996 | Zuin | 72/446 X |

FOREIGN PATENT DOCUMENTS

| | | |
|---|---|---|
| 0 643 457 A1 | 3/1995 | European Pat. Off. . |
| 0 687 040 A2 | 5/1995 | European Pat. Off. . |

*Primary Examiner*—Peter Vo
*Assistant Examiner*—Rick Kiltae Chang
*Attorney, Agent, or Firm*—Snell & Wilmer L.L.P.

[57] ABSTRACT

The present invention is directed to an apparatus and method for a unique crimping applicator which significantly advances a carrier strip (1.3 inches) to allow for the crimping of widely spaced terminals and a large variety of terminal sizes and configurations. The dual cam system includes a ram and a cam lever external to the ram which simultaneously move downward thereby activating the crimping process and simultaneously loading a compression spring assembly. In a preferred embodiment, an air feed is interchangeable with the spring assembly. Three disks allow more accurate adjustments for the crimp height, thus allowing a larger range of wire gauges than prior art devices. Allowing a wide variety of wire gauges enables the crimping of two or more wires into the same terminal using a single device. In a preferred embodiment, three disks allow the crimping applicator to accept approximately four different wire gauges or two ranges of wire gauges.

8 Claims, 2 Drawing Sheets

APPARATUS FOR SIGNIFICANTLY ADVANCING A CARRIER STRIP AND CRIMPING VARIOUS TERMINAL CONFIGURATIONS

TECHNICAL FIELD OF THE INVENTION

This invention generally relates to a crimp applicator, and more particularly, to a method and apparatus for efficiently advancing a carrier strip and crimping different types of terminals onto the ends of electrical conductors.

BACKGROUND OF THE INVENTION

Crimp applicators typically preform numerous functions including crimping a wire to a reel fed strip terminal connector, cutting off the terminal connector from the carrier strip, and feeding the terminal carrier strip through the applicator, thereby positioning the next terminal connector over the crimping anvil. Most crimp applicators use a standard design with retrofit alterations in preforming these functions (i.e., crimping, cutting and advancing) for specific types of terminal configurations. Consequently, if a factory desires to crimp a newly configured terminal onto a wire, the designated crimp applicator oftentimes must be adjusted and altered to compensate for the new terminal configuration; or a new crimp applicator must oftentimes be procured to meet specific specification requirements.

Adjusting and altering a crimping device for a newly configured terminal typically requires new perishable tooling and fabrication of several other components which are all assembled using skilled labor. A typical prior art system utilizes dual levers for adjusting the backfeed and feeding distance in a crimping applicator. To adjust the back feed or the feeding distance, the dual lever system not only requires various tools and expensive labor, but the dual lever system typically includes trial and error adjustments. In a dual lever system, a large nut is typically loosened which provides adjustment of the feeding stroke position and feeding stroke distance by changing the focal point of the dual lever rotational movement. Next, the adjusting threaded shaft is turned clockwise or counterclockwise to determine if the back feed is at the proper setting or if the terminal is positioned correctly over the anvil. To accurately align the backfeed and feeding distance using the trial and error method, a skilled laborer must often devote several hours of time. Furthermore, in many unionized states, one group of union employees usually are responsible for only operating the crimping applicator and are restricted from the use of tools. The use of tools is usually limited to a different group of union employees who are responsible for adjusting the crimping applicator. In certain factories, when a device requires tooling for its adjustments, efficiency is sacrificed and costs are increased.

Because of the difficulties of adjusting a crimping applicator, many factories utilize numerous applicators, each applicator being preset to a specific terminal configuration. When multiple applications exist, current systems often require the removal of the crimping applicator from the crimping press and the insertion of a new applicator in repetitive set-up conditions. When the terminals are being crimped to wires in numerous locations, numerous preset applicators must be located at the different locations. Sharing of applicators is often minimized due to the need of numerous preset conditions affecting minimum set-up time parameters. Purchase of large numbers of applicators is typically cost prohibitive; however, a monthly lease alternative to outright purchase is typically the standard in procurement practices. Additionally, when the same terminal is applied to both ends of a wire, an applicator is often required for each end. Consequently, when many different terminals or multiple terminals are applied to wires, costs are substantially increased because of the number of preset applicators needed. A crimping applicator is needed that can process more than one terminal in the same applicator without difficult adjustments. For example, if one applicator could process three different terminals, the number of crimping applicators required would be reduced by one third.

In addition to requiring different crimping applicators for each type of terminal, the prior art applicators typically do not offer sufficient versatility in accommodating various carrier terminal strips. Ease of change for set-up conditions for various carrier strip progressions would enable the crimping applicator to crimp a larger variety of terminals where spacing between adjacent terminals on a terminal carrier strip can vary with infinite repetitive possibilities.

In activating a crimping press cycle, the ram of the press moves downward to crimp a terminal. An internal cam (i.e., internal to the ram) provides displacement of about 0.3 inches such that the dual lever feeding mechanism aligns the next terminal with the crimping anvil. An internal cam system often limits the amount of displacement that is possible in a crimping applicator because the reduced space within the ram enclosure limits the size and movements of an internal cam system. Thus, an internal cam system for prior art applicators requires a complimentary external mechanization to amplify the cam displacement to match specific strip terminal progressions. In prior art dual lever systems, a feed finger is usually attached to the feeding mechanism (feed pawl) to provide a point of contact with the terminal strip so that with press activation, the next terminal is advanced over the crimping anvil. Once all adjustments have been completed, the feeding stroke then becomes a fixed condition.

Not only are feeding stroke distances limited by internal cams, but their forward reference locations are also typically limited by a forward stop in prior art spring energized applicators. A forward stop often varies in length depending on the desired progression for each terminal. Thus, for each terminal which requires a different progression, a different forward stop is typically retrofitted to the crimping applicator. Because a forward stop is typically attached to the crimping anvil, when the forward stop is replaced, the entire forward stop and crimping anvil component is also typically replaced. The replacement of the entire forward stop and crimping anvil component often requires increased downtime, skilled labor and increased costs.

Energized extension springs of prior art crimping applicators limit the scope of carrier strip progressions to minimum ranges. Some prior art systems use an extension spring whereby, upon activation of a crimping press, the extension spring is energized by displacing the internal cam on the applicator ram through a feed lever system combination. When the ram is pulled back up, the spring retracts to exert force against the feed pawl, and consequently, feeds the terminal through the crimping applicator. The restricted movement of the extension spring limits the range progression variations of the carrier strip.

Furthermore, as an alternative to an extension spring, other prior art crimping applicators use an air feed system to provide the forces necessary for the feed pawl to advance the carrier strip forward. A need exists for exchanging an energized spring system with an air feed system that minimizes use of change parts and excessive down time.

Unfortunately, the current state of the art does not allow an air feed to be connected to a crimping applicator which already contains an energized feed system or where internal cams in combination with dual lever mechanization are utilized.

SUMMARY OF THE INVENTION

The present invention is directed to an apparatus and method for a unique crimping applicator which provides flexibility in advancing various strip terminals thereby allowing for the crimping of widely spaced terminals and a wide variety of terminal sizes and configurations. The dual cam system design includes a ram, cam lever and a cam roller external to the ram. These components simultaneously move downward with press activation thereby activating the crimping cycle and simultaneously loading a spring assembly under compression. Three disks allow more accurate adjustments for the crimp height, thus allowing a larger range of wire gauges than prior art devices. Allowing a wide variety of wire gauges enables the crimping of two or more wires into the same terminal using similar perishable tooling combinations. In a preferred embodiment, three disks allow the crimping applicator to accept approximately four different wire gauges or two ranges of wire gauges.

During the downward movement of the application ram, the external cam lever contacts a feed roller to force the compression spring to compress, which upon return, advances the terminal carrier strip. A feed lever lock plate and a cam plate guide the cam lever so that it contacts the feed roller at the pro per time. Significant advancement of the carrier strip, about 1.3 inches, occurs when the energized spring under compression is released. With limited drag on the carrier strip, the present device does not require excessive spring loading to overcome excessive drag/load forces in preventing backfeeding of the terminal carrier strip. The compressed spring force allows advancement of the carrier strip through the crimping applicator at adjustable regulated speeds, thereby changing the acceleration of feed to suit given automated termination objectives and/or to prevent carrier strip damage or jamming conditions. In a preferred embodiment, the entire spring tube can be removed from the crimping applicator and suitably replaced with an air feed system for purposes of processing terminal strip progressions in excess of 1.3 inches, fully insulated plastic terminal strips and/or loose piece terminals loaded on a continuous feed mylar tape.

BRIEF DESCRIPTION OF THE DRAWING FIGURES

Preferred exemplary embodiments of the present invention will hereinafter be described in conjunction with the appended drawing figures, wherein like numerals denote like elements and:

FIG. 1 shows a front view of an exemplary embodiment of a crimping applicator, and FIG. 2 shows a rear view of an exemplary embodiment of a crimping applicator.

DETAILED DESCRIPTION OF PREFERRED EXEMPLARY EMBODIMENTS

Figure 1:
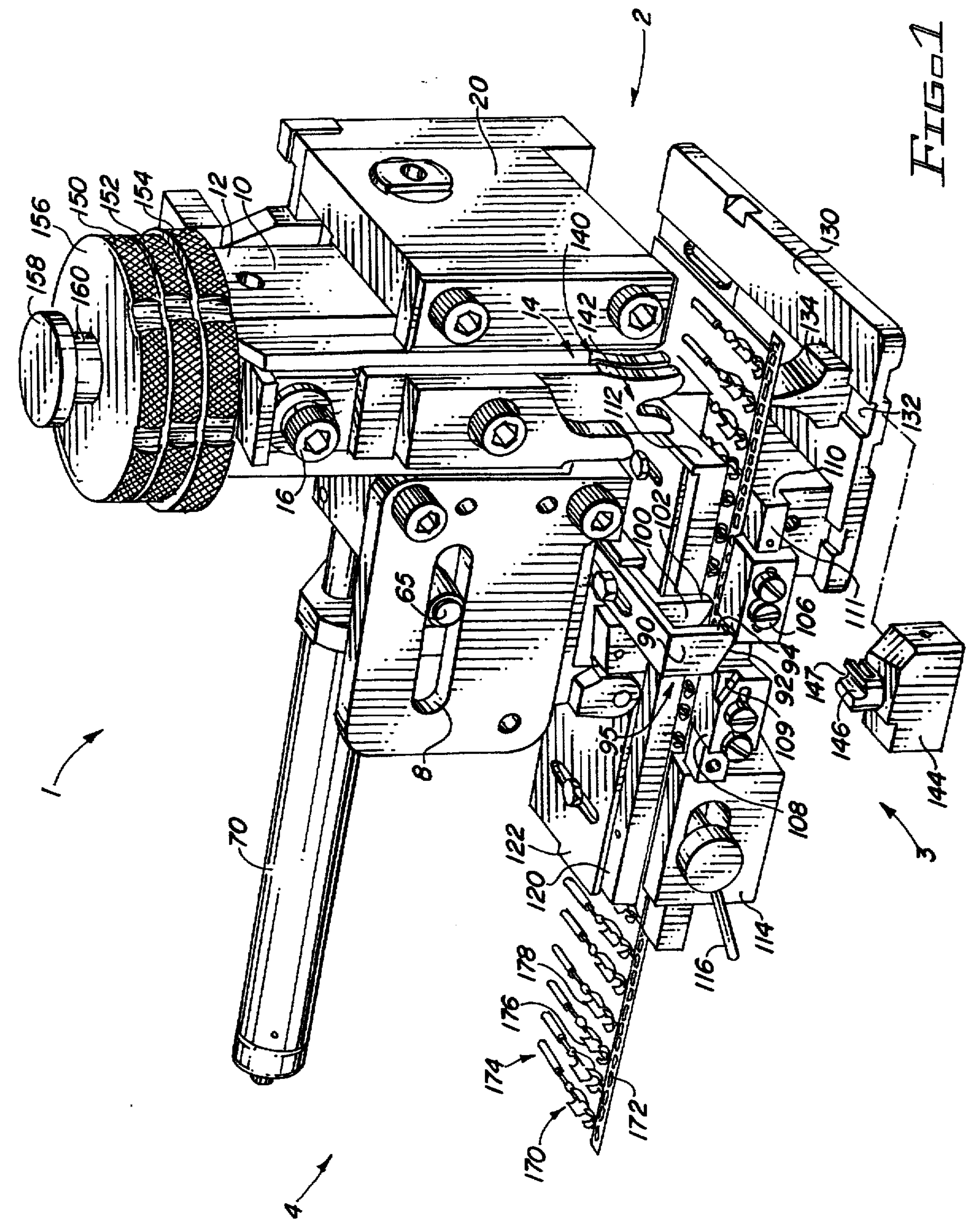

With reference to FIG. 1, an apparatus and method according to various aspects of the present invention is suitably configured to significantly advance a carrier strip 170 to allow for the crimping of widely spaced terminals 174 on carrier strip 170. An apparatus and method according to various aspects of the present invention is also suitably configured for crimping a large variety of terminal sizes and configurations. An exemplary apparatus and method for advancing carrier strip 170 according to various aspects of the present invention preferably comprises a ram 10, a cam lever 30, a spring 78 and dual feed pawls 90,100. While the manner in which carrier strip 170 is advanced is described in greater detail below, in general, cam lever 30, external to ram 10, suitably and simultaneously compresses spring 78 by contacting feed roller 60 and moving internal feed pawl 100 backwards away from the previous feed strip position, which upon return, advances carrier strip 170 to the next crimping position.

With continued reference to FIG. 1, exemplary ram 10 suitably comprises any device in accordance with the present invention capable of providing support and driving force for a crimping punch. In accordance with a preferred embodiment of the present invention, ram 10 preferably includes a substantially rectangular metal block. Ram 10 preferably includes a first end 12, a second end 14, a front face 16 and a rear face 18. Second end 14 of ram 10 is preferably reciprocally received into housing 20.

Figure 2:
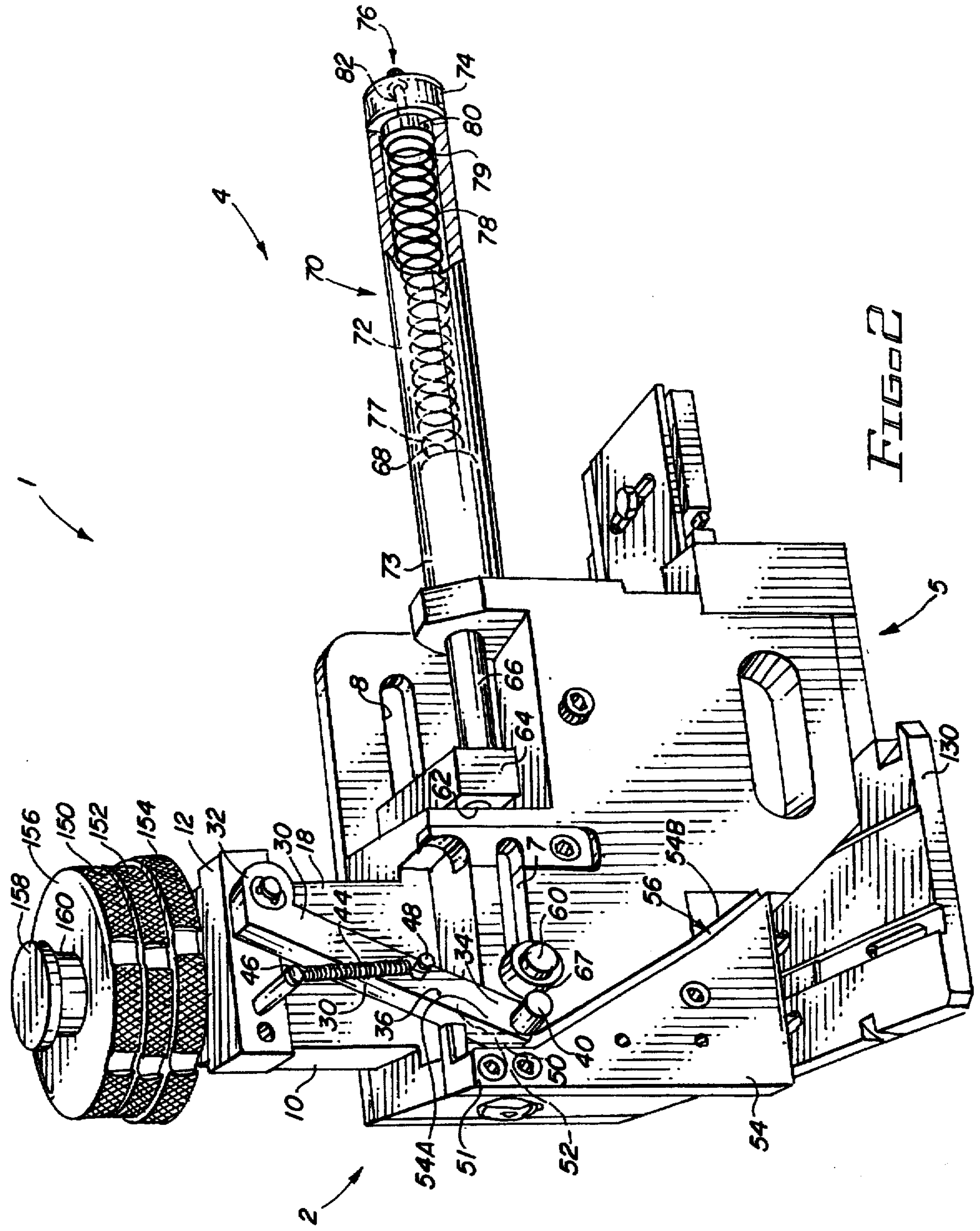

With reference to FIG. 2, exemplary cam lever 30 suitably comprises any lever in accordance with the present invention capable of initiating linear movement and causing compression of a spring. In accordance with a preferred embodiment of the present invention, cam lever 30 preferably includes a rectangular metal block. Cam lever 30 preferably includes a first end 32, a second end 34 and a mid-point 36. First end 32 of cam lever 30 is suitably pivotally mounted to first end 12 of ram 10. Second end 34 of cam lever 30 preferably includes feed lever roller 40 which is pivotally mounted to second end 34 of cam lever 30. Cam lever return spring 44 includes a first end 46 and a second end 48. First end 46 of cam lever return spring 44 is preferably attached to first end 12 of ram 10, while second end 48 of cam lever return spring 44 is suitably attached to midpoint 48 of cam lever 30.

With continued reference to FIG. 2, feed lever lock plate 50 is preferably attached to rear side 5 of crimping applicator 1. Feed lever lock plate 50 preferably includes a channel 52 which allows feed lever roller 40 to vertically translate. Exemplary cam plate 54 suitably comprises any device in accordance with the present invention capable of forcing the pivoting of cam lever 30. In accordance with a preferred embodiment of the present invention, cam plate 54 preferably includes a sloped edge having a channel 56 contained therein. Channel 56 is preferably aligned with channel 52. Cam plate 54 is fixedly attached to rear side 5 of crimping applicator 1 and lock plate 50 is preferably adjustable and attached to cam plate 54 so as to align channels 56 and 52.

With continued reference to FIG. 2, exemplary feed roller 60 suitably comprises any device in accordance with the present invention capable of providing force to compress a spring. In accordance with a preferred embodiment of the present invention, feed roller 60 preferably includes a metal dowel encircled by a roller bearing surface. Feed roller 60 is reciprocally received in, and travels along, rectangular opening 7 in crimping applicator 1. Feed shaft 66 includes a first end 67 and a second end 68. Feed roller 60 is suitably connected to first end 67 of feed shaft 66. Feed shaft 66 preferably traverses feed cylinder 62 and feed pawl retainer system 64, then is reciprocally received into spring tube assembly 70.

With continued reference to FIG. 2, exemplary spring tube assembly 70 suitably comprises any device in accordance with the present invention capable of linearly advancing feed pawl retainer system 64. In accordance with a preferred embodiment of the present invention, spring tube assembly 70 preferably includes a spring tube 70 enclosing second end 68 of feed shaft 66, spring 78, compression block 80, tightening bolt 82 and spring tightening opening 76. Spring 78 is preferably a compression spring and includes first end 77 which is in contact with second end 68 of feed shaft 66 and second end 79 which is suitably attached to compression block 80. Compression bolt 82 is preferably reciprocally received in spring tightening hole 76 such that, upon rotation of bolt 82, compression block 80 exerts pressure against second end 79 of spring 78.

With reference to FIGS. 1 and 2, exemplary feed pawl retainer system 64 suitably comprises any device in accordance with the present invention capable of translating feed pawls 90, 100. In accordance with a preferred embodiment of the present invention, feed pawl retainer system 64 preferably includes roller 65 which is reciprocally received in, and translates along, rectangular opening 8 within forward side 3 of crimping applicator 1. Feed pawl retainer system 64 also preferably includes outside feed pawl 90 and inside feed pawl 100 which are both adjustably attached to, and simultaneously translate with, roller 65 and feed pawl retainer system 64. Outside feed pawl 90 preferably includes a sloped lower edge 92, a forward edge 94, and a rear edge 95. Inside feed pawl 100 preferably includes a lower edge 102 which slopes downward thereby forming a substantially pointed end.

With reference to FIG. 1, forward stop 106 is preferably adjustably attached to lower guide plate 110 and suitably translates along the edge of lower guide plate 110. Progression override 108 is also preferably adjustably attached to lower terminal guide plate 110 and suitably translates along the edge of lower terminal guide plate 110. Drag assembly 114 is preferably adjustably attached adjacent lower terminal guide plate 110, toward back end 4 of crimping applicator 1. Drag assembly 114 preferably includes drag brake lever 116. Drag brake lever 116 is suitably engaged to prevent backfeed. Upper terminal guide plate 120 is preferably positioned above lower terminal guide plate 110. Terminal positioning plate 122 is preferably positioned above, and rests upon, upper terminal guide plate 120.

Base plate 130 is preferably attached to lower terminal guide plate 110 and provides a suitable means for adjustably attaching crimping applicator 1 to any suitable crimping press. Crimping anvil 134 is preferably adjustably attached to base plate 130 but can also translate along track 132 contained within base plate 130. Exemplary wire core crimping punch 140 suitably comprises any device in accordance with the present invention capable of crimping a wire core. Wire core crimping punch 140 is preferably adjustably mounted to first side 14 of ram 10. Exemplary insulation crimping punch 142 suitably comprises any device in accordance with the present invention capable of crimping the insulation grips of a terminal. Insulation crimping punch 142 is suitably adjustably mounted to wire core crimping punch 140. Floating shear holder 144 preferably includes a floating cut off shear 146 and a side cut 148. Exemplary carrier strip 170 preferably includes a plurality of progression holes 172 and a plurality of terminals 174. Each terminal 174 preferably includes a wire core crimp 176 and an insulation/support crimp 178.

With reference to FIG. 1, exemplary discs 150, 152, 154 suitably comprise any device in accordance with the present invention capable of receiving the force of a crimping press and adjusting the degree of travel of wire core crimping punch 140 and insulation crimping punch 142. In accordance with a preferred embodiment of the present invention, course adjustment disk 150 suitably enables the course adjustment of wire core crimping punch 140 and insulation crimping punch 142. Fine tuning wire core crimping disk 152 suitably enables the fine adjustments of wire core crimping punch 140. Fine tune insulation crimping disk 154 suitably enables fine tuning for insulation crimping punch 142. Fine tune disk 152 preferably rests upon fine tune disk 154 and course adjustment disk 150 preferably rests upon fine tune disk 152. Three disks allow more accurate adjustments for the crimp height, thus allowing a larger range of wire gauges than prior art devices. Allowing a wide variety of wire gauges enables the crimping of two or more wires into the same terminal using a single device. In a preferred embodiment, three disks 150,152,154 allow crimping applicator 1 to accept approximately four different wire gauges or two ranges of wire gauges.

With continued reference to FIG. 1, course adjustment disk 150 preferably includes raised contact points 156 which receive the force from the crimping press. Course adjustment disk 150 also preferably includes shank 160. In a preferred embodiment, shank 160 is a circular dowel which preferably emanates from the center of course adjustment disk 150. Shank 160 preferably includes disk 158 with a wider diameter than the diameter of shank 160, thus disk 158 provides an overhang which allows a crimping press to grasp disk 158 and pull ram 10 upwards.

Now turning to the operation of crimping applicator 1, with reference to FIG. 2, a dual cam system is shown preferably consisting of, inter alia, ram 10 and cam lever 30. Crimping applicator 1 is at an initial position whereby the crimping press has suitably pulled disk 158 near its maximum height. At near maximum height, ram 10 is substantially fully extended upward and feed lever roller 40 is also preferably near its maximum height (feed lever roller 40 is substantially at first end 51 of feed lever lock plate 50). Feed lever roller 40 is also preferably substantially engaged within channel 52 of feed lever lock plate 50. Channel 52 on feed lever lock plate 50 suitably prevents the horizontal movement of cam lever 30. In other words, channel 52 in feed lever lock plate 50 (which continues into cam plate 54 as channel 56) provides a suitable guide for feed lever roller 40 to travel through. Feed lever roller 40 preferably does not extend above feed lever lock plate 50 because it is pivotally mounted to cam lever 30 which is attached to ram 10 and ram 10 is suitably prevented from extending upward beyond a predetermined point. At the starting point, feed lever roller 40 lacks substantial contact with feed lever lock plate 50, but only travels vertically within the recessed ridge on the edge of feed lever lock plate 50. Cam surface 54A is substantially vertical and preferably consists of a cam surface on cam plate 54 and a substantially vertical cam surface on the opposite side of cam lever 30. Thus, no substantial friction exists between feed lever lock plate 50 and cam lever 30 or feed lever roller 40. Cam lever return spring 44 is preferably substantially fully compressed and feed roller 60 is substantially near its farthest horizontal position (closest to first end 2 of crimping applicator 1 and away from spring tube assembly 70).

With reference to FIGS. 1 and 2, as the crimping press activates, the press preferably contacts contact point 156 on the top surface of course adjustment disk 150 and suitably forces ram 10 downward substantially near its lowest position. The downward force upon ram 10 preferably causes wire core crimping punch 140 and insulation crimping punch 142 to respectively crimp one of a plurality of wire cores 176 and insulations 178. Cam lever 30, which preferably is held against channel 52 of feed lever lock plate 50 by cam lever return spring 44, is preferably forced vertically downward within channel 52 of feed lever lock plate 50 with cam surface 54A engaged. Once feed lever roller 40 contacts cam surface 54B of cam plate 54, feed lever roller 40 preferably follows angled channel 56 of cam plate 54. Angled cam surface 54B suitably forces feed lever roller 40 to slope away from the vertical cam surface 54A and feed lever lock plate 50 and toward second end 4 of crimping applicator 1. As feed lever roller 40 travels along channel 56 and cam surface 54B of cam plate 54, feed lever roller 40 suitably forces cam lever 30 to pivot counterclockwise about first end 32, thereby stretching cam lever return spring 44.

Upon pivoting of cam lever 30, cam lever 30 eventually contacts feed roller 60 and suitably forces feed roller 60 to travel horizontally, within opening 7 of housing 20, toward second end 4 of crimping applicator 1 (away from cam plate 54 and toward spring tube assembly 70). In a preferred embodiment, the maximum possible movement of feed roller 60 is about 1.3 inches. Feed roller 60 is suitably attached to feed shaft 66 and feed shaft 66 is reciprocally received within feed cylinder 62 and spring tube 72. Consequently, feed roller 60 forces feed shaft 66 further into spring tube assembly 70 thereby compressing spring 78 within spring tube 72. Feed pawl retainer system 64 is also suitably attached to a predetermined point on feed shaft 66. Thus, feed pawl retainer system 64 simultaneously moves horizontally with feed shaft 66 toward second end 4. Upon movement of feed pawl retainer system 64, feed pawls 90, 100 also move simultaneously horizontally towards second end 4 of crimping applicator 1. While simultaneously moving the feed pawl retainer system 64, feed roller 60 also forces feed shaft 66 into spring tube assembly 70, After the crimping press preferably forces ram 10 downward substantially near its lowest position, thereby crimping terminal 174 to the wire, the crimping press preferably pulls on the ridge of disk 158 (on top of shaft 160) thereby pulling ram 10 upward again. Consequently, in a preferred embodiment, crimping applicator 1 is based on a post feed arrangement whereby carrier strip 170 suitably feeds through the device upon the upstroke of the press. Cam lever return spring 44, being stretched from the counterclockwise pivot of cam lever 30, preferably retracts and forces cam lever 30 to pivot clockwise back near its original position. During the pivot of cam lever 30, feed lever roller 40 is preferably guided back through channel 56 of cam plate 54 and along cam surface 54B, back to first end 51 of feed lever lock plate 50. Furthermore, upon clockwise pivoting of cam lever 30 and because the force exerted back against feed shaft 66 by spring 78, feed roller 60 translates substantially horizontally back toward first end 2 of crimping applicator 1, while second end 68 of feed shaft 66 slides away from spring tube assembly 70.

With reference to FIGS. 1 and 2, the substantial horizontal motion of feed shaft 66 toward first end 2 of crimping applicator 1 also suitably forces feed pawl retainer system 64 back toward first end 2 of crimping applicator 1. The substantial horizontal movement of feed pawl retainer system 64 simultaneously causes feed pawls 90, 100 to suitably translate toward first end 2 of crimping applicator 1 until outside feed pawl 90 contacts forward stop 106. Once outside feed pawl 90 contacts forward stop 106, terminal 174 is optimally positioned substantially over crimping anvil 134. Roller 65 preferably rests within horizontal opening 8 within housing 20 and is suitably attached to feed pawl assembly 64. By smoothly translating along opening 8, roller 65 provides ease of linear movement of entire pawl assembly 64 (i.e. inside pawl 90 and outside pawl 100). Forward stop 106 provides a stop position for outside feed pawl 90 and inside feed pawl 100 which engages feeding carrier strip 170. Additionally, forward stop 106 also preferably simultaneously stops roller 65 from horizontally translating along opening 8 within front side 3 of housing 20.

With reference to FIG. 1, forward stop 106 of the present invention can be used with most terminal configurations because of its positioning capabilities. Forward stop 106 is a separate component suitably attached to lower terminal guide plate 110. Lower terminal guide plate 110 preferably includes a plurality of holes which allow forward stop 106 and progression override 108 to be positioned, preferably through the use of a 4-40 screw, anywhere along lower terminal guide plate 110. In a preferred embodiment, loosening the screw will suitably allow forward stop 106 to be horizontally positioned along lower terminal guide plate 110 within an approximate range of ¼ inch. To avoid the need for skilled tradesmen to use tools to adjust crimping applicator 1, in a preferred embodiment, all of the adjustments on the applicator can be accomplished through the use of levers and knobs.

More particularly with reference to FIG. 1, in the crimping mode, spring 78 is suitably compressed and the entire pawl assembly suitably moves back towards second end 4 and away from forward stop 106. Angled bottom edge 92 of outside feed pawl 90 preferably includes the same slope as angled top corner 109 of progression override 108, thereby allowing a smooth transition. As outside feed pawl 90 substantially moves away from forward stop 106, angled bottom edge 92 of outside feed pawl 90 preferably slides up angled top corner 109 of progression override 108. As a result of outside feed pawl 90 moving up angled top corner 109 of progression override 108, outside feed pawl 90 preferably elevates. As outside feed pawl 90 elevates, outside feed pawl 90 preferably causes internal feed pawl 100 to also elevate, thereby elevating internal feed pawl 100 out of progression hole 172 and above carrier strip 170 surface. The elevation of outside feed pawl 90 suitably avoids the dragging of inside feed pawl 100 over carrier strip 170, thus reducing the need for excessive drag forces applied by drag brake lever 116.

Excessive backward force from a dragging feed pawl often disrupts the alignment of carrier strip 170 which may prevent progression hole 172 from being properly fed through the device. Drag assembly 114 suitably provides a force to move carrier strip 170 forward and preferably compensates for the dragging of inside feed pawl 100 on carrier strip 170 to avoid excessive backward force and movement against carrier strip 170. However, because inside feed pawl 100 is elevated and provides limited drag on carrier strip 170, the present device does not need excessive spring loading from the drag mechanism to prevent backward movement. In a preferred embodiment, the drag pressure is substantially reduced such that use of a 5 lb. load requirement on spring 78 is needed to move carrier strip 170 through crimping applicator 1.

With reference to FIGS. 1 and 2, the spring force is substantially equal to the amount of force needed to overcome drag brake 116 and the sliding friction of carrier strip 170. The inventive progression override 108 substantially reduces the need for large drag assembly pressure, and thus, less spring force is needed to advance carrier strip 170. Consequently, because drag assembly 114 experiences a smaller backward spring force, spring tube assembly 70 includes a less powerful spring force for pushing carrier strip 170 forward. The smaller spring force has many advantages. Compressing and releasing spring 78 in spring tube 72 is substantially an energy absorbing action. When too much energy is absorbed, spring 78 in spring tube 72 needs to release the excess energy which may send carrier strip 170 through crimping applicator 1 at a quicker pace than crimping applicator 1 is designed to control. By incorporating a lighter spring, less energy is absorbed. With the lower energy, carrier strip 170 is sent through crimping applicator 1 at a substantially regulated speed. As an example, the fastest crimping apparatus currently on the market can crimp about 85 terminals a minute, which is better than one per second. Thus, substantially avoiding the energy buildup in spring 78 is extremely beneficial for substantially avoiding abrupt movement in carrier strip 170 at such high speeds, thereby allowing the device to function accurately with minimal damage to the terminal carrier strip and with minimal terminal strip jamming conditions.

In a preferred embodiment, spring tube 72 may incorporate at least one of three different spring configurations to compensate for differing load conditions. For example, a 5 lb., 10 lb. or 15 lb. spring can be chosen for different applications. However, extremely heavy terminals typically require very large springs. To avoid the size and expense of large springs, in an alternative embodiment, an air feed is substituted for spring assembly 70. An air feed system can be set at much higher loads and the air feed applicator can be much more accurately set to specific control parameters. In a preferred embodiment, entire spring tube 72 can be removed from crimping applicator 1 and suitably replaced with an air feed system. The replacement of spring tube 72 is aided by threaded first end 73 of spring tube 72 which is easily removed from the assembly. The optional air feed applicator allows progressions longer than about 1.3 inches because spring 78 limitations are non-existent.

Floating cutoff shear 146 is suitably attached to floating shear holder 144 which suitably attaches to crimping anvil 134. Floating cutoff shear 146 is preferably slotted such that carrier strip 170 is fed through slot 147. Floating cutoff shear 146 suitably forces carrier strip 170 around shear 146, and subsequently, shear 146 suitably cuts carrier strip 170 from terminal 174, thereby leaving terminal 174 substantially free from carrier strip 170. In a preferred embodiment, floating shear holder 144 also includes a side cut surface 148 whereby carrier strip 170 is suitably cut into smaller pieces ("slugs"). As an alternative embodiment, side cut 148 is not incorporated into floating shear holder 144, thus allowing carrier strip 170, once removed from terminals 174, to remain in one long piece.

Terminal positioning plate 122 suitably comprises any guide plate in accordance with the present invention capable of restricting the vertical movement of carrier strip 170. Terminal positioning plate 122 preferably rests on top of upper terminal guide plate 120. Terminal positioning plate 122 is suitably adjustable such that it moves in the vertical plane and provides an upper limitation to substantially prevent carrier strip 170 from buckling or moving in the vertical plane. To compensate for a heavier terminal with a higher profile, terminal positioning plate 122 is simply moved vertically away from lower terminal guide plate 110, thus allowing more room for the terminals' progression.

Upper terminal guide plate 120 suitably comprises any guide plate in accordance with the present invention capable of preventing the horizontal movement of carrier strip 170. Upper terminal guide plate 120 is preferably located below terminal positioning plate 122 and above carrier strip 170. Upper terminal guide plate 120, once set, suitably guides carrier strip 170 and suitably forces the edge of carrier strip 170 against the ridge on lower terminal guide plate 110. Upper terminal guide plate 120 preferably moves in the horizontal plane and suitably provides a slight pressure against carrier strip 170 to prevent carrier strip 170 from horizontal movement perpendicular to the direction of progression.

First side 111 of lower terminal guide plate 110 preferably includes a raised edge which serves as a guide for carrier strip 170 and also, along with upper terminal guide plate 120, substantially prevents horizontal movement. Carrier strip 170 preferably abuts first side 111 of lower terminal guide plate. Face 112 of lower terminal guide plate 110 suitably allows carrier strip 170 to slide upon during its progression. Along with terminal positioning plate 122 which substantially prevents carrier strip 170 from buckling upward, face 112 of lower terminal guide plate 110 also provides a lower boundary to substantially prevent carrier strip 170 from buckling downward.

It will be apparent to those skilled in the art that the foregoing detailed description of a preferred embodiment of the present invention is representative of a method and apparatus for crimping various terminal configurations to wires and advancing the same within the scope and spirit of the present invention. Further, those skilled in the art will recognize that various changes and modifications may be made without departing from the true spirit and scope of the present invention. Those skilled in the art will recognize that the invention is not limited to the specifics as shown here, but if claimed in any form or modification falling within the scope of the appended claims. For that reason, the scope of the present invention is set forth in the following claims.

I claim:

1. A crimping applicator for crimping a wide variety of terminal configurations to a wire including:

a ram including at least one crimping punch;

a cam lever pivotally attached to, and external to, said ram;

a feed roller positioned to be translated by said cam lever, said feed roller configured to translate parallel to a spring assembly;

said spring assembly subject to compression by said ram, and at least one internal feed pawl for variably advancing a carrier strip and at least one external feed pawl connected to said internal feed pawl, said external feed pawl adjustably attached to said spring assembly.

2. The crimping applicator of claim 1, wherein said spring assembly includes a compression spring.

3. The crimping applicator of claim 1, wherein said spring assembly is configured to be removed from said crimping applicator and replaced by an air feed assembly.

4. The crimping applicator of claim 1, wherein said internal feed pawl advances said carrier strip at least 0.010 inches.

5. The crimping applicator of claim 1, wherein said crimping applicator further includes at least one progression override for reducing drag on said internal feed pawl.

6. The crimping applicator of claim 1, wherein said crimping applicator further includes at least one forward stop attached to a guide plate for providing a forward stop position on said internal feed pawl.

7. The crimping applicator of claim 1, wherein said crimping applicator includes at least three adjustment disks for adjusting the degree of travel of at least one crimping punch.

8. The crimping applicator of claim 1, wherein said crimping applicator is configured to allow manual adjustments of at least one of forward progression stop setting, back feed override setting, cut off tab and strip guide setting and vertical guide location setting, thereby substantially reducing the need for tooling for making adjustments.

* * * * *